United States Patent
Dill et al.

(10) Patent No.: US 6,394,268 B1
(45) Date of Patent: May 28, 2002

(54) NAIL-TYPE FASTENER COLLATION STRIP WITH FASTENER GUIDE RINGS, AND COMBINATION THEREOF

(75) Inventors: Michael C. Dill, Elk Grove Village; William L. Gabriel, Barrington, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 35 days.

(21) Appl. No.: 09/675,221

(22) Filed: Sep. 29, 2000

(51) Int. Cl.[7] ............................................... B65D 85/24
(52) U.S. Cl. ....................................................... 206/347
(58) Field of Search ................................. 206/338, 340, 206/341, 343–347, 820; 411/442, 443

(56) References Cited

U.S. PATENT DOCUMENTS

| | | | |
|---|---|---|---|
| 354,462 A | 12/1886 | Copeland | |
| 1,263,218 A | 4/1918 | Fischer | |
| 2,982,595 A | 5/1961 | Rogers, Jr. | |
| 3,357,761 A | 12/1967 | Langas et al. | |
| 3,463,304 A | 8/1969 | Gallee et al. | |
| 3,802,987 A | 4/1974 | Noll | |
| 3,823,818 A | 7/1974 | Shaw | |
| 4,106,618 A | * 8/1978 | Haytayan | 206/347 |
| 4,167,229 A | 9/1979 | Keusch et al. | |
| 4,298,121 A | 11/1981 | Oide et al. | |
| 4,913,611 A | 4/1990 | Leistner | |
| 4,932,821 A | * 6/1990 | Steffen et al. | 206/347 |
| 5,069,340 A | * 12/1991 | Ernst et al. | 206/347 |
| 5,544,746 A | 8/1996 | Dohi | |
| 5,713,709 A | 2/1998 | Huang | |
| 5,775,514 A | 7/1998 | Lin | |
| 5,865,311 A | * 2/1999 | Hentges et al. | 206/347 |
| 5,931,298 A | 8/1999 | Huang | |
| 5,931,622 A | 8/1999 | Gupta et al. | |
| 6,044,972 A | * 4/2000 | Rohrmoser et al. | 206/347 |
| 6,082,536 A | * 7/2000 | Ito et al. | 206/344 |
| 6,135,278 A | * 10/2000 | Rohrmoser et al. | 206/347 |
| 6,250,464 B1 | * 6/2001 | Daubinger et al. | 206/343 |

* cited by examiner

Primary Examiner—Luan K. Bui
(74) Attorney, Agent, or Firm—Schwartz & Weinrieb

(57) ABSTRACT

A collation strip, and a collation strip assembly, comprises a plurality of fasteners upon which a plurality of collar members are disposed, the collar members being interconnected by means of a plurality of web members. Undersurface portions of the collar members are adapted to support the collation strip assembly upon rail members of a tool magazine, and in addition, the collar members have annular guide ring portions which cooperate with head portions of the fasteners so as to guide the fasteners in a two-point axially spaced manner within the nosepiece bore of the tool so as to ensure coaxial disposition of the fasteners within the bore throughout their driven movement through the bore by means of a tool driving blade assembly.

25 Claims, 3 Drawing Sheets

NAIL-TYPE FASTENER COLLATION STRIP WITH FASTENER GUIDE RINGS, AND COMBINATION THEREOF

FIELD OF THE INVENTION

The present invention relates generally to collation strips for fasteners which are adapted to be disposed within power tool magazine assemblies so as to be driven by means of suitable driver blade assemblies of the power tools into any one of a variety of substrates, such as, for example, masonry, concrete, steel, wood, or the like, and more particularly to a new and improved nail collation strip which is provided with fastener guide rings for respective use in conjunction with each one of the nail-type fasteners so as to define a new and improved collation strip assembly which is able to be supported upon the rail members or shear blocks provided within the power tool magazine assembly and to ensure that the nail-type fasteners are driven and guided in a substantially coaxial manner within the nosepiece bore of the power tool whereby the nail-type fasteners are driven along axes which are disposed substantially perpendicular to the face of the substrate into which the nail-type fasteners are to be driven.

BACKGROUND OF THE INVENTION

Nail-type fasteners, to be driven into an underlying substrate such as, for example, masonry, steel, concrete, wood, or the like, are usually fed within magazine assemblies of fastener-driving power tools in the form of collated strips. The strips of fasteners are moved along the magazine assembly by means of, for example, well-known spring-biasing mechanisms so as to serially dispose or present an endmost one of the fasteners coaxially within a nosepiece bore whereby a driver blade assembly of the power tool can then impact the endmost one of the fasteners, cause separation of the endmost one of the fasteners from the remaining portion of the collated strip of fasteners, and subsequently drive the endmost one of the fasteners through the nosepiece bore and into the substrate.

One important objective, to always be achieved in conjunction with the driving of such nail-type fasteners into a particular substrate by means of such fastener-driving tools, is to ensure as best as possible that the longitudinal axis of each nail-type fastener is disposed substantially perpendicular to the face or surface of the substrate upon which the tool nosepiece is disposed during the fastener-driving operation. This not only ensures that the nail-type fastener is completely or fully driven into the substrate so as to correspondingly achieve full or complete penetration into the substrate and thereby enhance withdrawal resistance of the nail-type fastener from the substrate, but in addition, such disposition of each nail-type fastener further ensures proper seating of the fastener upon the substrate so as to in turn ensure, for example, proper clamping or attachment of components or work elements to the substrate. In particular, if the fastener is inserted into the substrate in a non-perpendicular or askewed or tilted manner, one side portion of the fastener head can in effect be embedded within, for example, a sheet-type component to be secured to the underlying substrate, while the diametrically opposite side portion of the fastener head can be disposed slightly above the surface of the sheet-type component. Wind forces can then cause portions of the sheet-type component to be pulled or blown over the fastener head eventually leading to dislodgment or disengagement of the sheet-type component from its secured state upon the substrate. Accordingly, it is essential or imperative that such nail-type fasteners not only be presented or disposed in a substantially coaxial manner with respect to the nosepiece bore of the fastener-driving tool, but in addition, it is also essential or imperative to retain such coaxial disposition of the nail-type fastener within the nosepiece bore of the fastener-driving tool throughout the entire driving movement of the nail-type fastener through the nosepiece bore of the fastener-driving tool.

One manner or means for dealing with this problem of properly presenting the nail-type fasteners to the nosepiece bore of the tool such that the nail-type fasteners will be disposed or oriented in a substantially coaxial manner with respect to the nosepiece bore of the fastener-driving tool has been alluded to or briefly disclosed within U.S. Pat. No. 5,931,622 which issued to Gupta et al. on Aug. 3, 1999. As disclosed within FIG. 10 of such patent, the angling or "cocked" disposition of the fastener assembly 50 is reduced or substantially eliminated by minimizing the distance defined between the head portion 62 of the fastener 60 and the upper inner wall 212 of the magazine holder 210. While such means has adequately addressed the problem or difficulty of properly presenting, disposing, or orienting the nail-type fasteners with respect to the nosepiece bore 220 of the tool prior to the actual disposition of each nail-type fastener 60 within the nosepiece bore 220, a need still exists for maintaining such proper disposition or orientation of the nail-type fastener within the nosepiece bore of the tool throughout the entire fastener driving operation.

Still further, as has been noted hereinbefore, it is also known that conventional fastener-driving power tools have magazine structures incorporated therein wherein the collated strips of nail-type fasteners are moved along magazine rail members or shear blocks by means of the aforenoted spring-biasing mechanisms. In accordance with a conventional type of magazine assembly or rail system, the nail-type fasteners are supported upon the magazine rails or shear blocks by means of their head structures. If, however, substantially long or elongated nail-type fasteners are being employed, it is conceivable that as a result of such nail-type fasteners being supported upon the magazine rail members by means of their head structures, the shank portions of the nail-type fasteners may no longer be disposed or presented to the nosepiece bore of the tool in a coaxial manner. Accordingly, when the nail-type fasteners are subsequently individually driven into and through the nosepiece bore of the tool by means of the tool driver blade assembly, it is likely that such nail-type fasteners may not be driven through the nosepiece bore in a coaxial manner whereby proper insertion of the nail-type fasteners into the substrate will not be achieved. The components to be attached to the substrate may therefore not in fact be properly or securely attached, and in addition, the pull-out or withdrawal resistance of the fasteners with respect to the substrate may be compromised.

Still yet further, while collated strips of fasteners are of course well known, one of the most common methods of forming such collated strips of fasteners is to firstly form the collated strips from a suitable plastic material by means of suitable injection molding techniques, and subsequently, to either insert the nails into recesses or pockets specially formed within a single one the strips, or to insert the nails between a pair of collation strips which are then, for example, heat-sealed together. Either one of such collation strip processing techniques, however, is quite tedious and time-consuming, and is therefore not particularly desirable from an economical manufacturing point of view.

A need therefore exists in the art for a new and improved collated strip of nail-type fasteners wherein the collation strip is to be integrally disposed or formed upon the multiple shanks of serially arranged nail-type fasteners so as to render the fabrication of the collated strip of nail-type fasteners economical from a manufacturing point of view. In addition, a need exists in the art for a new and improved collated strip of nail-type fasteners wherein the collation strip could in effect simultaneously perform a plurality of functions such as, for example, to support the collated strip of nail-type fasteners upon the rail members or shear blocks of the tool fastener magazine so as to guide the collated strip of nail-type fasteners through the tool fastener magazine, and to cooperate with the head structures of the nail-type fasteners so as to guide individual ones of the plurality of nail-type fasteners through the nosepiece bore of the tool as the fasteners are serially driven through the nose-piece bore of the tool by means of the tool driver blade assembly and thereby ensure the coaxial disposition of the nail-type fasteners within the nosepiece bore of the tool during the entire driven operation of each nail-type fastener through the nosepiece bore of the tool so as to in turn ensure the fact that the nail-type fasteners are properly disposed or oriented with respect to the substrate into which the nail-type fasteners are being driven.

OBJECTS OF THE INVENTION

Accordingly, it is an object of the present invention to provide a new and improved collated strip for nail-type fasteners, and a new and improved collation strip assembly comprising the collation strip and the nail-type fasteners.

Another object of the present invention is to provide a new and improved collation strip for nail-type fasteners, and a new and improved collation strip assembly comprising the collation strip and the nail-type fasteners, which overcomes the various disadvantages and drawbacks characteristic of PRIOR ART collated strips of nail-type fasteners.

An additional object of the present invention is to provide a new and improved collation strip for nail-type fasteners, and a new and improved collation strip assembly comprising the collation strip and the nail-type fasteners, which is economical to manufacture.

A further object of the present invention is to provide a new and improved collation strip for nail-type fasteners, and a new and improved collation strip assembly comprising the collation strip and the nail-type fasteners, which is able to simultaneously support the collated strip of nail-type fasteners upon the rail members or shear blocks of the tool fastener magazine so as to guide the collated strip of nail-type fasteners through the tool fastener magazine, and to cooperate with the head structures of the nail-type fasteners so as to guide individual ones of the plurality of nail-type fasteners through the nosepiece bore of the tool as the fasteners are serially driven through the nosepiece bore of the tool by means of the tool driver blade assembly and thereby ensure the coaxial disposition of the nail-type fasteners within the nosepiece bore of the tool during the entire driven operation of each nail-type fastener through the nosepiece bore of the tool so as to in turn ensure the fact that the nail-type fasteners are properly disposed or oriented with respect to the substrate into which the nail-type fasteners are being driven.

SUMMARY OF THE INVENTION

The foregoing and other objectives are achieved in accordance with the teachings and principles of the present invention through the provision of a new and improved collation strip for nail-type fasteners, and a new and improved collation strip assembly comprising the collation strip and the nail-type fasteners, which comprises a plurality of nail-type fasteners upon the shanks of which a collation strip has been formed by extrusion techniques. The collation strip can be fabricated from any one of a plurality of thermoplastic materials, such as, for example, polyethylene (PE), polypropylene (PP), polystyrene (PS), or a combination thereof, and the collation strip member disposed annularly around each one of the nail-type fasteners has a substantially bell-shaped cross-sectional configuration. The flat bottom surface of the bell-shaped member enables the bell-shaped members, and therefore the entire collation strip assembly comprising the collation strip and the nail-type fasteners, to be supported upon the rail members or shear blocks of the power tool magazine assembly as the collated strip of fasteners is incrementally moved toward the nose-piece bore of the tool by means of the tool magazine spring-biasing assembly. In addition, the outer diametrical extent or dimension of each bell-shaped members is fabricated so as to be substantially the same as the outer diametrical extent of each head member of each nail-type fastener. In this manner, each nail-type fastener is able to be supported at two axially separated locations along the longitudinal or axial extent thereof so as to ensure that each nail-type fastener is coaxially disposed within the nosepiece bore of the power tool throughout the entire driven movement of each nail-type fastener through the nosepiece bore of the power tool by means of the tool driver blade assembly. If desired, additional collation strips may be provided upon the shank portions of the nail-type fasteners such that the nail-type fasteners are supported at more than two axially spaced locations thereof.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
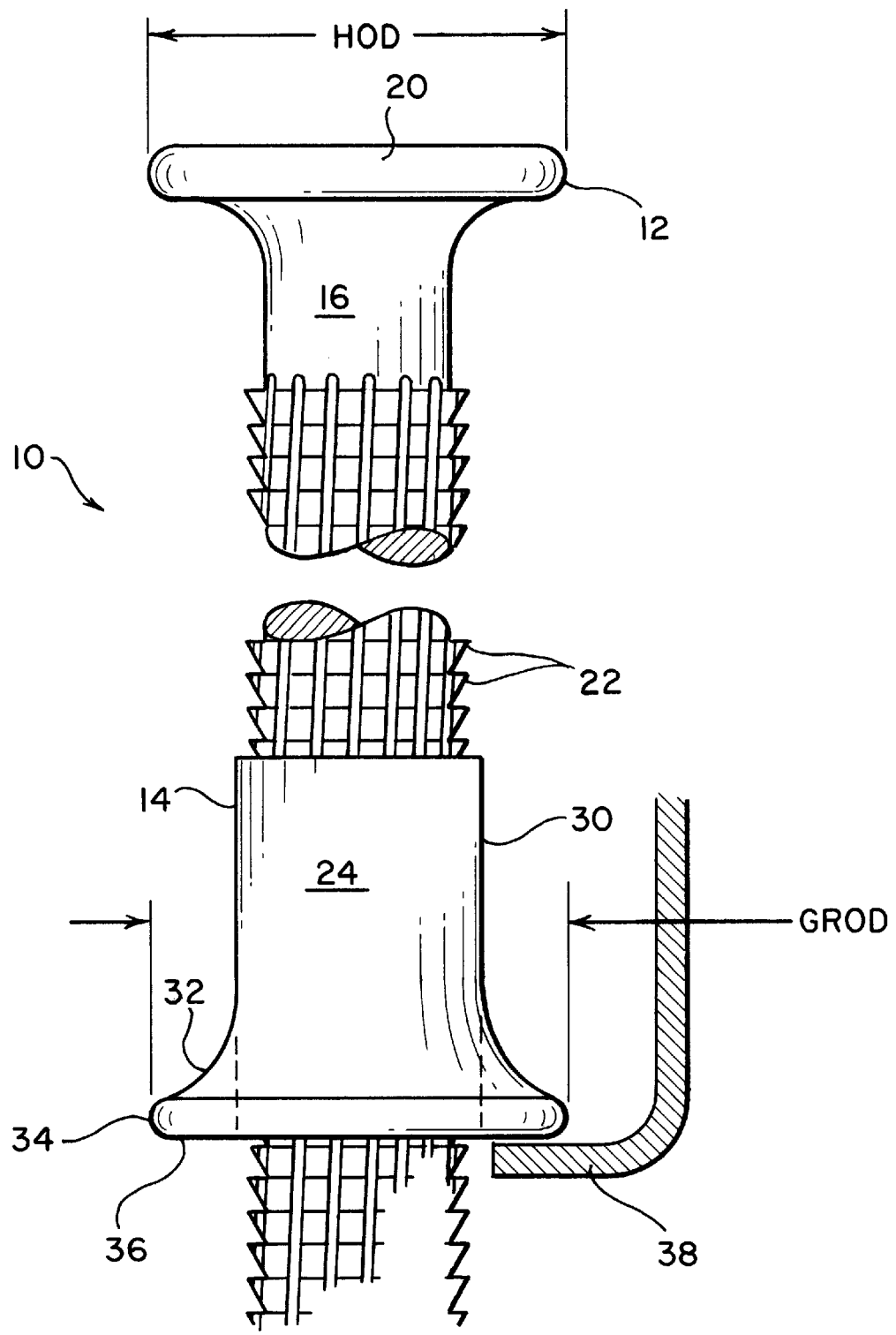
FIG. 1 is an end elevational view, partly in cross-section, of a new and improved nail-type fastener collation strip assembly comprising the collation strip of the present invention as mounted upon the shank portions of nail-type fasteners wherein the bottom or lower surface portion of the collation strip is able to support the combination of the collation strip of nail-type fasteners upon a lower rail member or shear block of a power tool magazine assembly.
Figure 2:
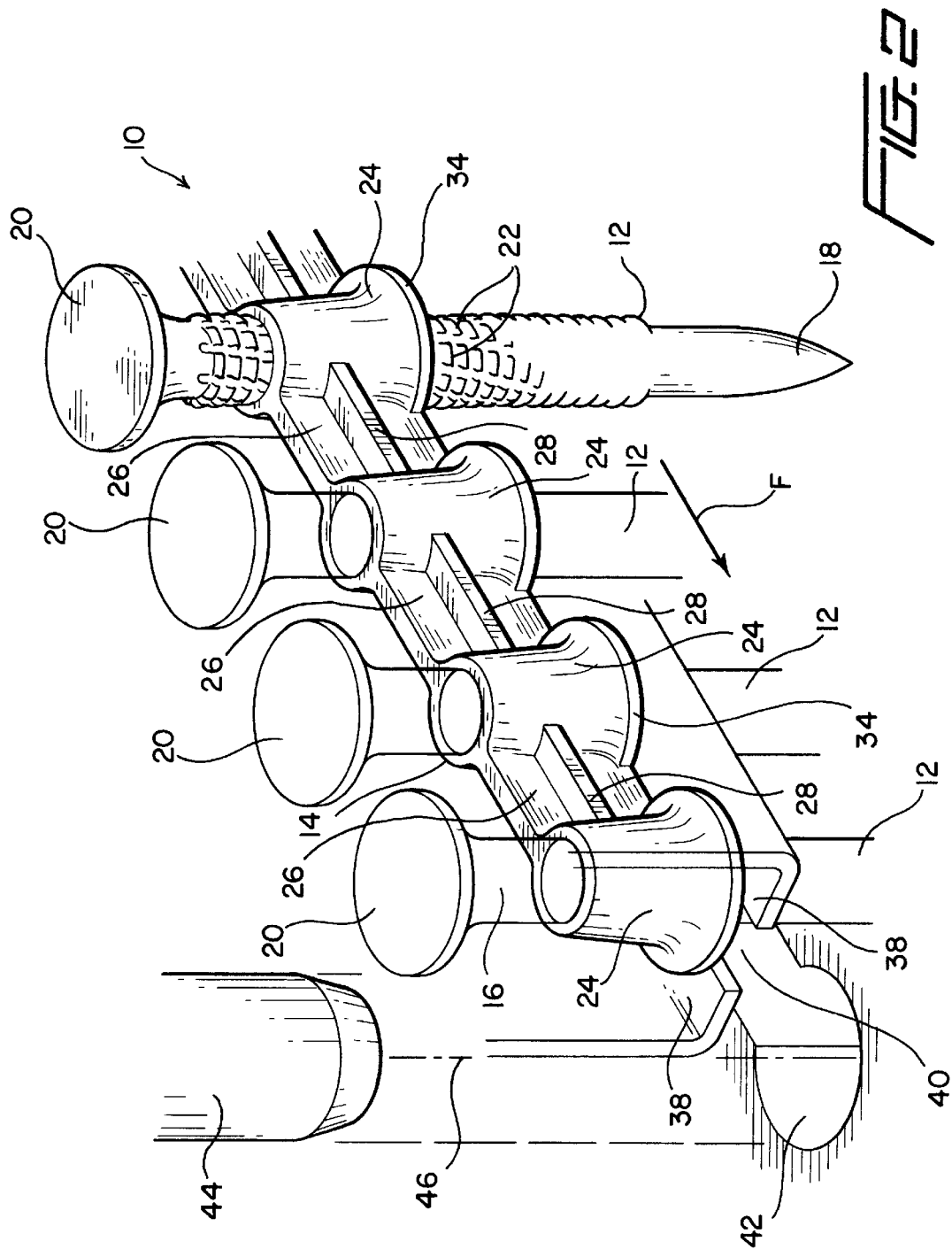
FIG. 2 is a perspective view of the new and improved nail-type fastener collation strip assembly comprising the collation strip of the present invention as mounted upon the shank portions of nail-type fasteners wherein the bottom or lower surface portion of the collation strip is able to support the combination of the collation strip of nail-type fasteners upon a lower rail member or shear block of a power tool magazine assembly adjacent to the tool nosepiece bore in preparation for the incremental movement of the collated strip of nail-type fasteners toward the tool nosepiece bore such that a leading one of the nail-type fasteners can be driven by means of the driver blade assembly.
Figure 3:
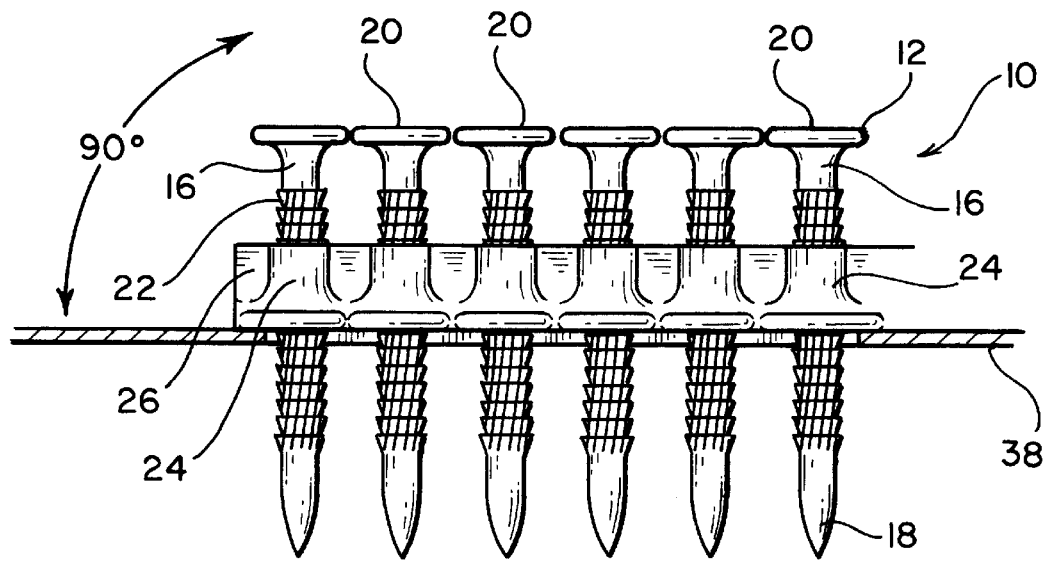
FIG. 3 is a side elevational view, corresponding to the end and perspective views of FIGS. 1 and 2, of the new and improved nail-type fastener collation strip assembly comprising the collation strip of the present invention as mounted upon the shank portions of nail-type fasteners wherein the bottom or lower surface portion of the collation strip is able to support the combination of the collation strip of nail-type fasteners upon a lower horizontally disposed rail member or shear block of a power tool magazine assembly.

Referring now to the drawings, and more particularly to FIGS. 1–3 thereof, a first embodiment of a new and improved nail-type fastener collation strip assembly constructed in accordance with the principles and teachings of the present invention and showing the cooperative parts thereof is disclosed and is generally indicated by the reference character 10. More particularly, the nail-type fastener collation strip assembly 10 is seen to comprise a plurality of laterally spaced nail-type fasteners 12 and a collation strip 14. The nail-type fasteners 12 are adapted to be driven into a suitable substrate member, not shown, which may be, for example, masonry, concrete, steel, wood, or the like, and each one of the nail-type fasteners 12 is seen to comprise a shank portion 16, a tip portion 18, and a head portion 20. The shank portion 16 of each nail-type fastener 12 is seen to further comprise a plurality of annular rib-type members 22 such that together the rib-type members 22 provide a substantial portion of the external periphery of each shank portion 16 with a saw-tooth configuration as may be appreciated in longitudinal or axial cross-section. This saw-tooth configuration defined upon the external periphery of each shank portion 16 of each nail-type fastener 12 provides each nail-type fastener 12 with enhanced gripping properties and pull-out or withdrawal resistance once the nail-type fastener 12 has been driven into the particular substrate.

The collation strip 14 is seen to further comprise a plurality of annular collar members 24 which are respectively formed about an intermediate or axially central region of each shank portion 16 of each nail-type fastener 12 such that each collar member of the collation strip 14 is axially spaced from both the head portion 20 of its associated fastener 12 as well as from the tip portion 18 of the associated fastener 12. In addition, the collation strip 14 also comprises a plurality of transversely disposed web members 26 which integrally interconnect adjacent collar members 24, and each web member 26 is provided with a transversely extending rib member 28. The collation strip 14 may be fabricated from any one of a plurality of suitable thermoplastic materials, or a combination thereof, such as, for example, polyethylene (PE), polypropylene (PP), or polystyrene (PS), and the collation strip 14 is formed in accordance with known extrusion processing techniques.

In accordance with the unique structure comprising the collation strip 14 constructed in accordance with the principles and teachings of the present invention, it is seen that each one of the collar members 24 has a substantially bell-shaped or frusto-conical configuration. More particularly, it is noted that each collar member 24 comprises an upper substantially cylindrical or tubular portion 30 and a radially outwardly flared portion 32 which terminates in a lower end annular ring portion 34. Still further, the annular ring portion 34 therefore defines a lower or undersurface portion 36. This particular structure of each collar member 24 serves at least two major functions in conjunction with the nail-type fastener collation strip assembly 10 of the present invention. Firstly, the lower or undersurface portions 36 of the nail-type fasteners 12 serve to support the nail-type fastener collation strip assembly 10 upon horizontally disposed rail members or shear blocks 38,38 which are provided within the tool magazine and which project toward each other in a laterally spaced manner so as to define a space 40 therebetween. The lower shank and tip portions of the nail-type fasteners 12 can therefore depend downwardly through the space 40, and in this manner, the collated strip of nail-type fasteners 12 can be moved along the rail members or shear blocks 38,38, as indicated by the arrow F shown in FIG. 2, by means of a known spring-biasing mechanism, not shown, such that leading ones of the nail-type fasteners 12 can be serially presented to and moved into a nosepiece bore 42 of the powered tool. As is well-known in the art, a tool driver blade assembly 44 is adapted to be moved downwardly through or within the nosepiece bore 42 so as to individually sever the leading one of the nail-type fasteners 12 from the collation strip 14, and drive the severed leading one of the nail-type fasteners 12 through the nosepiece bore 42 and into the substrate, not shown.

It can therefore be appreciated that as a result of the provision of the plurality of uniquely structured bell-shaped or frusto-conically configured collar members 24, as well as the respective disposition of each collar member 24 upon the axially central region of each shank portion 16 of each nail-type fastener 12, the plurality of nail-type fasteners 12 are supported or guided upon the magazine assembly rail members or shear blocks 38,38 in a substantially vertical orientation whereby the vertical axis of each nail-type fastener 12, as each nail-type fastener 12 is presented to and disposed within the nosepiece bore 42 of the powered tool, is coaxial with respect to the longitudinal axis 46 of the nosepiece bore 42. This coaxial disposition of each nail-type fastener 12 with respect to the nosepiece bore 42 initially ensures that each nail-type fastener 12 will be presented to and inserted within the substrate, not shown, in a substantially perpendicular manner with respect to the surface or face of the substrate into which the nail-type fastener 12 is being driven and inserted. It is to be emphasized that if the collation strip 14 and the collar members 24 thereof were not disposed upon substantially axially central regions of the shank portions 16 of the nail-type fasteners, that is, if the collation strip 14 and the collar members 24 were disposed upon upper regions of the shank portions 16 of the nail-type fasteners 12 so as to be disposed, for example, adjacent to the head portions 12 of the nail-type fasteners 12, then the depending shank portions 16 of the nail-type fasteners 12 would not necessarily be disposed in vertical planes and not necessarily presented to and inserted within the nosepiece bore 42 of the tool in the aforenoted desired coaxial manner with respect to the nosepiece bore 42 of the powered tool.

The second major function served by means of the unique structure of each collar member 24 of the nail-type fastener collation strip assembly 10 of the present invention resides in the fact that the outer peripheral surface of the annular ring portion 34 has an outer diametrical extent which is substantially equal to the outer diametrical extent of the head portion 20 of each associated nail-type fastener 12. In this manner, it can therefore be readily and additionally appreciated that each nail-type fastener 12 is secondarily guided, in a coaxial manner with respect to the axis 46 of the nosepiece bore 42, through the nosepiece bore 42 of the tool so as to again ensure that each nail-type fastener 12 will be presented to and inserted within the substrate, not shown, in a substantially perpendicular manner with respect to the surface or face of the substrate into which the nail-type fastener 12 is being driven and inserted. More particularly, the outer diametrical extent of the head portion 20 of each nail-type fastener 12 is designated as HOD, as seen in FIG. 1, and the outer diametrical extent of the annular guide ring portion 34 of each collar member 24 is designated as GROD as also seen in FIG. 1. As has been noted herein-before, the outer diametrical extent HOD of the head portion 20 of each nail-type fastener 12 is fabricated so as to be substantially equal to the outer diametrical extent GROD of the guide ring portion 34 of each collar member 24.

In addition, the outer diametrical extent HOD of each head portion 20 of each nail-type fastener 12, as well as the outer diametrical extent GROD of each guide ring portion 34 of each collar member 24, is fabricated so as to be just slightly less than the inner diametrical extent of the nosepiece bore 42. Accordingly, each head portion 20 of each nail-type fastener 12 serves along with each guide ring portion 34 of each collar member 24 to define an axially separated two-point guidance system for coaxially guiding the movement of each nail-type fastener 12 with respect to the nosepiece bore 42 during the movement of each nail-type fastener 12 through the nosepiece bore 42 under the driving influence of the driver blade assembly 44. In this manner, the axial driven movement of the nail-type fastener 12 through the nosepiece bore 42 of the powered tool, as well as the perpendicular movement of the nail-type fastener 12 with respect to the surface or face of the substrate into which the nail-type fastener 12 is being driven, is effectively ensured.

Figure 4:
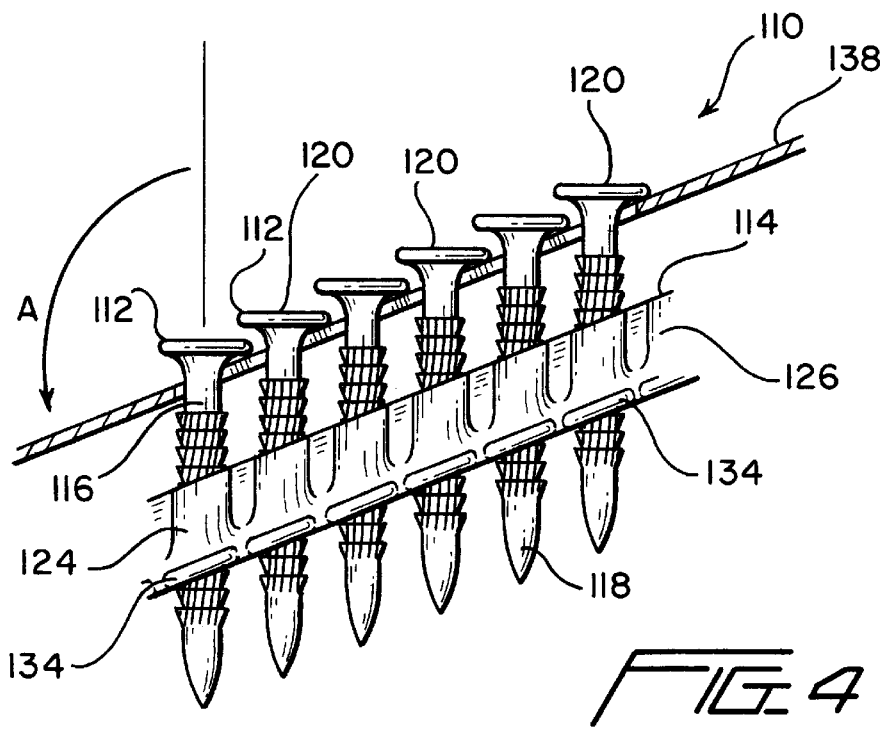
FIG. 4 is a side elevational view similar to that of FIG. 3 showing, however, a second embodiment of a new and improved nail-type fastener collation strip assembly comprising the collation strip of the present invention as mounted upon the shank portions of nail-type fasteners wherein the nail-type fasteners are supported by means of their head members upon an upper rail member or shear block of a power tool magazine assembly and wherein the head members of adjacent fasteners are vertically offset with respect to each other, the shank portions of the fasteners are disposed within vertical planes, and the upper rail member of the magazine assembly is disposed at a predetermined angle with respect to a horizontal plane.

With reference now being made to FIG. 4, and with comparison also being made to FIG. 3, a second embodiment of a new and improved a new and improved nail-type fastener collation strip assembly constructed in accordance with the principles and teachings of the present invention is disclosed and is generally indicated by the reference character 110. It is to be noted that for the purposes of simplicity and brevity, all components of the new and improved nail-type fastener collation strip assembly 110 will not be described in detail in view of the fact that the components of the collation strip assembly 110 correspond essentially to the various components of the collation strip assembly 10 disclosed within FIGS. 1–3, and accordingly, such components of the collation strip assembly 110 which correspond to those components of the collation strip assembly 10 will be designated by similar reference characters except that they will be within the 100 series. As can be readily appreciated from a comparison made between FIGS. 3 and 4, several differences are apparent between the embodiments of the nail-type fastener collation strip assemblies 10 and 110 of FIGS. 3 and 4. Firstly, in lieu of the horizontally disposed magazine rail members 38 being disposed perpendicular, or at an angle of 90°, with respect to the vertical longitudinal axes of the nail-type fasteners 12 as shown in conjunction with the collation strip assembly 10 disclosed within FIG. 3, the magazine assembly rail members 138 are disposed at a predetermined angle A with respect to the vertical longitudinal axes of the nail-type fasteners 112 wherein, for example, angle A is approximately 125°.

In addition, while it is seen that the collation strip collar members 124 are similarly disposed upon axially central regions of the shank portions 116 of the nail-type fasteners 112 with the longitudinal axes of the collar members 124 being coaxially disposed with respect to the longitudinal axes of the nail-type fasteners 112, the longitudinal transverse extent of the collation strip web portion 126, as well as the guide ring portions 134, are likewise disposed at predetermined angles A with respect to vertical planes such as, for example, the aforenoted angle of approximately 125°, so as to be disposed substantially parallel to the magazine rail members 138. Lastly, it is likewise seen that in lieu of the collation strip assembly 110 being supported upon the magazine rail members 138 by means of the guide ring portions 134 of the collation strip collar members 124, the collation strip assembly 110 is supported within the tool magazine assembly as a result of the head portions 120 of the nail-type fasteners 112 being slidably supported upon the rail members 138. In order to facilitate the operative viability of such structural assembly 110, it is also seen that the head portions 120 of the nail-type fasteners 112 are vertically off-set with respect to each other such that the locus of the head portions 120 of the plurality of nail-type fasteners 112 is generally parallel to the rail members 138.

In this manner, those tools which have magazine rail members 138 which are inclined to the vertical through means of, for example, the aforenoted angular orientation of approximately 125° can nevertheless have their nail-type fasteners provided with the collation strip of the present invention. More importantly, even though the collation strip 114 is not used in accordance with this embodiment, or in conjunction with such tools wherein the magazine rail members 138 are disposed at the aforenoted predetermined angle with respect to horizontal or vertical planes, so as to initially guide the nail-type fasteners 112 along the guide rail members 138, the guide ring members 134 operatively associated with each one of the nail-type fasteners 112 still serve their important function in guiding each nail-type fastener 112, along with the head portion 120 of each nail-type fastener 112, through the nosepiece bore 42 of the powered tool as each nail-type fastener 112 is being driven through the nosepiece bore 42 of the powered tool by means of the driver blade assembly 44 such that each nail-type fastener is still guided through the nosepiece bore 42 of the powered tool in accordance with the two-point, axially spaced guided mode.

It is also important to note that the disposition of the collation strip 114 upon axially central portions of the nail-type fasteners 112 is in fact necessary to achieve the aforenoted two-point, axially spaced guided mode of the head-supported fasteners 112 because if, for example, the collation strip 114 was mounted, for example, upon upper end portions of the fasteners shanks 116 so as to be disposed adjacent to the head portions 120, the remaining dependent portions of the fastener shanks 116 would in effect be unconstrained whereby the fastener shanks 116 would not necessarily be disposed parallel to each other and with their longitudinal axes disposed vertically. Accordingly, the nail-type fasteners 112 would not be ensured to enter the nosepiece bore 42 of the powered tool in a substantially vertical, coaxial manner with respect to the longitudinal axis 46 of the nosepiece bore 42. To the contrary, in accordance with the teachings of the present invention, the nail-type fasteners 112, in a manner similar to the nail-type fasteners 12, are ensured that when the same are driven through the nosepiece bore 42 of the powered tool, by means of the driver blade assembly 44, and into the particular substrate, the longitudinal axis of each nail-type fastener 112 will be disposed perpendicular to the face or surface of the substrate upon which the powered tool is disposed and into which the nail-type fastener 112 is being inserted.

Thus, it may be seen that in accordance with the principles and teachings of the present invention, a new and improved collation strip, and a new and improved collation strip assembly, has been developed wherein the collation strip comprises bell-shaped collar portions and is adapted to be mounted upon axially central shank portions of the nail-type fasteners such that the nail-type fasteners are constrained so as to be disposed parallel to each other and presented to the nosepice bore of the power tool in a coaxial manner with respect to the longitudinal axis of the nosepiece bore. In addition, the lower end guide ring portions of the bell-shaped collar portions cooperate together with the head portions of the nail-type fasteners in establishing a two-point guidance system for each nail-type fastener as each nail-type fastener is driven through the nosepiece bore of the power tool by means of the tool driver blade assembly. Still further, in those particular power tools wherein the same is provided with horizontally disposed lower magazine rail members or shear blocks, the lower end guide ring portions of the collar portions of the collation strip also serve to support the collation strip assembly upon the magazine rail members or shear blocks.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A collation strip for disposition upon a plurality of fasteners so as to form a collated strip of fasteners to be loaded into a tool magazine and be serially driven through a nosepiece bore of the tool, comprising:

a plurality of collar members adapted to be respectively disposed upon a plurality of fasteners; and a plurality of web members integrally interconnecting said plurality of collar members such that when said plurality of collar members are respectively disposed upon the plurality of fasteners, said plurality of collar members, said plurality of web members, and the plurality of fasteners form a collated strip of fasteners;

said plurality of collar members each respectively comprising a substantially cylindrical portion having a first predetermined diametrical extent throughout its circumferential extent and adapted to be disposed upon a shank portion of each one of the plurality of fasteners, a single annular guide ring member respectively comprising an outer peripheral surface, having a second predetermined diametrical extent which is substantially larger than said first predetermined diametrical extent of said collar member, for engaging an interior wall portion of a tool nosepiece bore so as to guide each one of the plurality of fasteners as each one of the plurality of fasteners is driven through the nosepiece bore by a tool driver blade assembly, and an interconnecting portion extending radially outwardly from said substantially cylindrical portion having said first predetermined diametrical extent to said single annular guide ring member having said second predetermined diametrical extent so as to integrally interconnect said substantially cylindrical portion to said single annular guide ring member.

2. The collation strip as set forth in claim 1, wherein:

each one of said collar members has a substantially bell-shaped cross-sectional configuration.

3. The collation strip as set forth in claim 2, wherein:

each one of said bell-shaped collar members comprises a substantially cylindrical portion adapted to be disposed upon a shank portion of each one of the plurality of fasteners, and a radially outwardly flared portion integrally interconnecting said substantially cylindrical portion to said annular guide ring member.

4. The collation strip as set forth in claim 1, wherein:

said annular guide ring member is disposed upon a lower end portion of each collar portion.

5. The collation strip as set forth in claim 1, wherein:

said collation strip comprises an extrusion structure.

6. The collation strip as set forth in claim 5, wherein:

said collation strip is fabricated from a thermoplastic material.

7. The collation strip as set forth in claim 6, wherein:

said thermoplastic material is selected from the group consisting of polyethylene, polypropylene, and polystyrene.

8. The collation strip as set forth in claim 1, wherein:

each one of said plurality of annular guide ring members comprises an undersurface portion for supporting said plurality of collar members and the collated strip of fasteners upon rail members of the tool magazine.

9. The collation strip as set forth in claim 8, wherein:

said substantially cylindrical portion is defined around a longitudinal axis; and said undersurface portion is disposed perpendicular to said longitudinal axis.

10. The collation strip as set forth in claim 1, wherein:

each one of said collar members comprises a longitudinal axis; and said web members extend in a direction transverse to said longitudinal axes of said collar members and together define a transverse axis which is disposed at a predetermined angle with respect to said longitudinal axes of said collar members.

11. The collation strip as set forth in claim 10, wherein:

said transverse axis of said web members is disposed at an angle of approximately 35° with respect to said longitudinal axes of said collar members.

12. A collated strip of fasteners for disposition within a tool magazine such that a plurality of fasteners can be serially driven through a nosepiece bore of a fastener-driving tool, comprising:

a plurality of fasteners respectively having shank portions and head portions;

a plurality of collar members respectively disposed upon said shank portions of said plurality of fasteners;

a plurality of web members integrally interconnecting said plurality of collar members such that when said plurality of collar members are respectively disposed upon said plurality of fasteners, said plurality of collar members, said plurality of web members, and said plurality of fasteners form said collated strip of fasteners;

said plurality of collar members each respectively comprising a substantially cylindrical portion having a first predetermined diametrical extent throughout its circumferential extent and adapted to be disposed upon a shank portion of each one of said plurality of fasteners, a single annular guide ring member respectively comprising an outer peripheral surface, having a second predetermined diametrical extent which is substantially larger than said first predetermined diametrical extent of said collar member, for engaging an interior wall portion of a tool nosepiece bore, and for cooperating with a respective one of said head portions of said plurality of fasteners, so as together guide each one of said plurality of fasteners in a coaxial manner with respect to the nosepiece bore of the fastener-driving tool as each one of said plurality of fasteners is driven through the nosepiece bore of the fastener-driving tool by a tool driver blade assembly, and an interconnecting portion extending radially outwardly from said substantially cylindrical portion having said first predetermined diametrical extent to said single annular guide ring member having said second predetermined diametrical extent so as to integrally interconnect said substantially cylindrical portion to said single annular guide ring member.

13. The collated strip of fasteners as set forth in claim 12, wherein:

said plurality of collar members are respectively mounted at substantially axially central regions of said shank portions of said plurality of fasteners so as to be axially spaced from said head portions of said plurality of fasteners such that each one of said plurality of fasteners is guided through the nosepiece bore of the fastener-driving tool by means of a two-point axially-spaced guidance system.

14. The collated strip of fasteners as set forth in claim 12, wherein:

each one of said annular guide ring members of said collar members has a first outer diametrical extent; and each one of said head portions of said plurality of fasteners has a second outer diametrical extent, said first and second outer diametrical extents of said annular guide ring members of said collar members and said head portions of said plurality of fasteners are substantially equal to each other so as to define said two-point axially-spaced guidance system.

15. The collated strip of fasteners as set forth in claim 12, wherein:

each one of said collar members has a substantially bell-shaped cross-sectional configuration.

16. The collated strip of fasteners as set forth in claim 15, wherein:

each one of said bell-shaped collar members comprises a substantially cylindrical portion adapted to be disposed upon said shank portion of each one of said plurality of fasteners, and a radially outwardly flared portion integrally interconnecting said substantially cylindrical portion to said annular guide ring member.

17. The collated strip of fasteners as set forth in claim 12, wherein:

said annular guide ring member is disposed upon a lower end portion of each collar portion.

18. The collated strip of fasteners as set forth in claim 12, wherein:

said collar members and said web members of said collated strip of fasteners together comprise an extrusion structure.

19. The collated strip of fasteners as set forth in claim 18, wherein:

said extrusion structure is fabricated from a thermoplastic material.

20. The collated strip as set forth in claim 19, wherein:

said thermoplastic material is selected from the group consisting of polyethylene, polypropylene, and polystyrene.

21. The collated strip of fasteners as set forth in claim 12, wherein:

each one of said plurality of annular guide ring members comprises an undersurface portion for supporting said plurality of collar members and said collated strip of fasteners upon rail members of the tool magazine.

22. The collated strip of fasteners as set forth in claim 21, wherein:

said substantially cylindrical portion is defined around a longitudinal axis; and said undersurface portion is disposed perpendicular to said longitudinal axis.

23. The collated strip of fasteners as set forth in claim 12, wherein:

each one of said collar members comprises a longitudinal axis; and said web members extend in a direction transverse to said longitudinal axes of said collar members and together define a transverse axis which is disposed at a predetermined angle with respect to said longitudinal axes of said collar members.

24. The collated strip of fasteners as set forth in claim 23, wherein:

said transverse axis of said web members is disposed at an angle of approximately 35° with respect to said longitudinal axes of said collar members.

25. The collated strip of fasteners as set forth in claim 23, wherein:

said head portions of said plurality of fasteners are vertically offset with respect to each other so as to define a locus which is parallel to said transverse axis of said web members and to enable the support of said collated strip of fasteners by said head portions upon rail members of the fastener-driving tool.

* * * * *